(No Model.) 2 Sheets—Sheet 2.

R. C. SMITH.
HOISTING MACHINERY.

No. 425,261. Patented Apr. 8, 1890.

Witnesses
Jno. G. Hinkel Jr.
W. S. McArthur

R. C. Smith  Inventor
By his Attorneys
Foster & Freeman

UNITED STATES PATENT OFFICE.

RUDOLPH C. SMITH, OF YONKERS, N. Y., ASSIGNOR TO THE OTIS BROTHERS & COMPANY, OF NEW YORK.

HOISTING MACHINERY.

SPECIFICATION forming part of Letters Patent No. 425,261, dated April 8, 1890.

Application filed June 14, 1888. Serial No. 277,121. (No model.)

*To all whom it may concern:*

Be it known that I, RUDOLPH C. SMITH, a citizen of the United States, and a resident of Yonkers, in the county of Westchester and State of New York, have invented a new and useful Improvement in Safety Devices in Hoisting Machinery, of which the following is a specification.

The object of my invention is to prevent the derangement of the suspensory or hoisting cable of an elevator in case the cage or platform is arrested in its descent, and to this end I provide means whereby to take up the slack of the cable resulting from the paying out of the cable after the movement of the cage or platform is arrested, and whereby, if desired, the movement of the elevating-engine may be quickly arrested when the cable is paid out after the stoppage of the cage.

Figure 1:
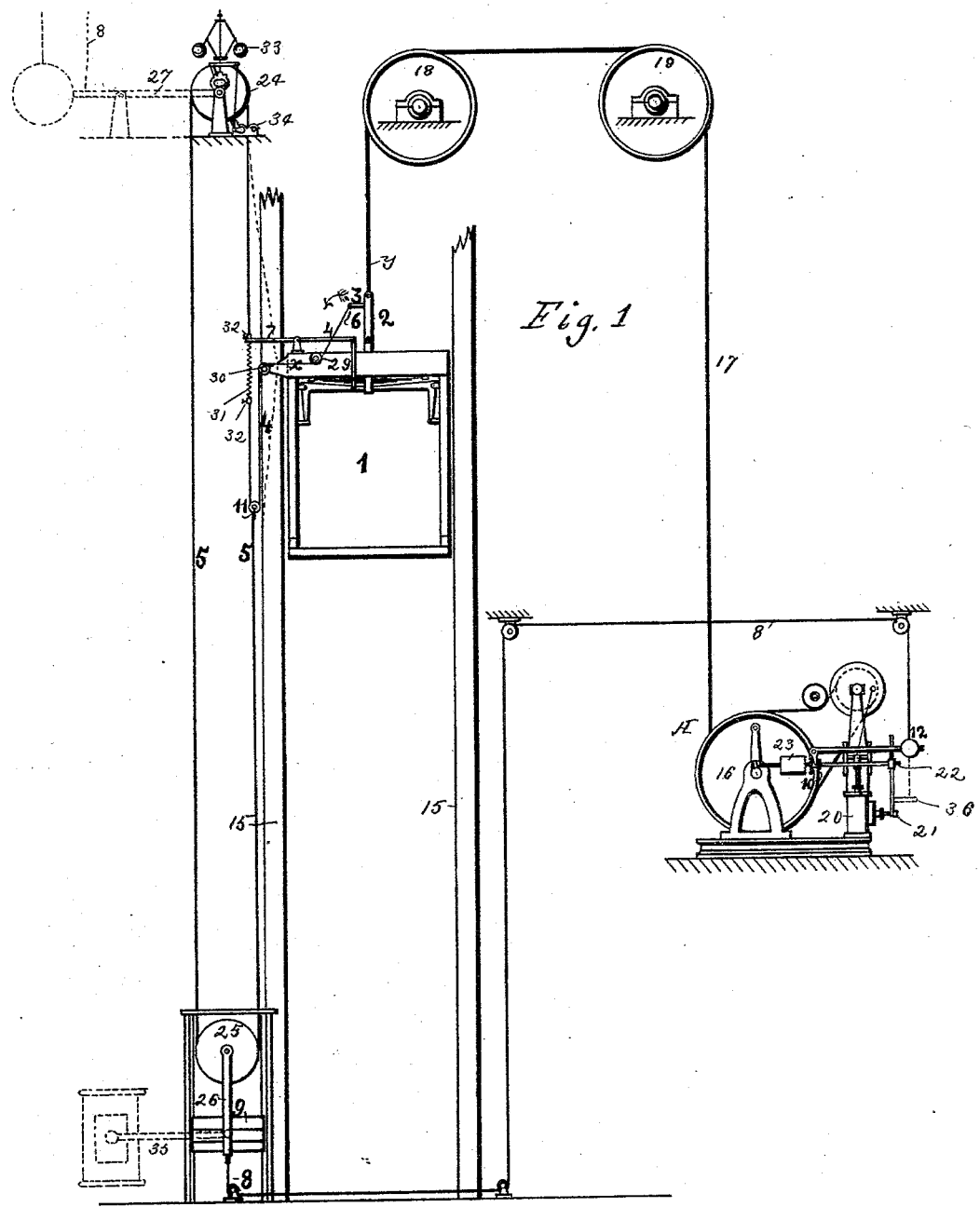
Figure 2:
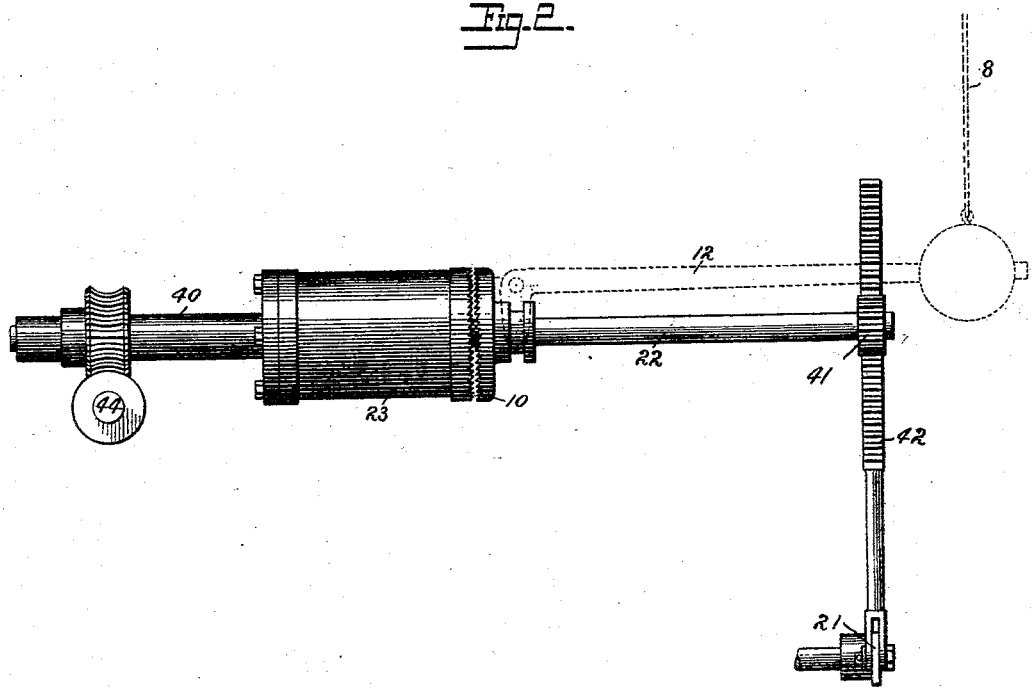

In the accompanying drawings, Figure 1 illustrates my invention in connection with an elevator-cage and steam hoisting-engine. Fig. 2 is a view illustrating the construction of the clutch and its connection with the valve.

My invention may be carried into effect in connection with an elevator cage or platform 1 of any suitable construction, a cage being shown in the drawings as arranged to slide between vertical guides 15 15, as usual, and raised and lowered by means of an engine A, having a drum 16, from which the hoisting-cable 17 passes over guide-pulleys 18 and 19 to the cage.

The hoisting-engine A may be of any suitable construction, the figure illustrating the general features of an Otis steam elevating-engine, in which the drum 16 is driven by a belt from the vertical reciprocating engine 20 and in which the throttle-valve is provided with an arm 21, operated by the rotation of a shaft 22. The shaft 22 is in line with a shaft 40, having a worm-gear connection with the drum-shaft 44, and the shaft 40 has fixed on it one part 23 of a clutch, while the other part 10 of the clutch is carried by but slides on the shaft 22. A lever 12 serves to slide the part 10 to throw the clutch-sections into and out of gear. A pinion 41 on the shaft 22 gears with a rack 42, connected with the arm 21 on the throttle-spindle.

In connection with the traveling cage I make use of a traveling rope 5, which passes over an elevated pulley 24 and under a pulley 25, near the bottom of the well, one of the pulleys turning in fixed bearings and the other being vertically movable. Thus, as shown, the pulley 24 revolves in fixed bearings at the top of the well, and the pulley 25 is supported by the loop of the rope 5, and a stirrup 26, which hangs from the pulley 25, supports guiding-weights 9.

Instead of the construction described, the lower pulley may turn in fixed bearings and the upper pulley may turn in bearings of a weighted lever 27. (Shown in dotted lines.) In either case there is a connection 8 (shown in the form of a cord or cable) between the vertically-movable pulley and the stopping and starting device of an elevator-engine. As shown, the cord 8 passes around guide-pulleys to the end of the lever 12, which is weighted, and when the parts are in their normal position the lever 12 is maintained in such a position as to hold the clutch-section 10 out of engagement with the section 23.

A flexible band or cord 4 is connected with the suspensory cable 17 (or with a link 2 in the line of said cable and forming practicably a part thereof) at a point some distance above the point of connection between the cable and the cage, and at the other end the said cord 4 is connected with the traveling rope 5, and the cord 4 is of such a length that it tends to contract the traveling cable to a certain extent, and thereby draw the vertically-movable pulley to a position nearer to the fixed pulley than it would occupy if the connecting-cord 4 were slackened. This connection may be formed in different ways, as shown in full lines. The cord 4 may constitute a part of the rope 5, one end being attached to an arm 6 of the link 2, the rope then passing under the pulley 29, over a pulley 30, and downward round a pulley 11 in a block connected to the other end of the rope 5, and thence upward, constituting one part of the traveling rope. In either case the connection is such that the pulley 25 is maintained in a higher position than it would occupy if the cord 4 were slackened or broken.

So long as the elevator is in normal operation the parts will remain in their positions shown in the drawings; but should the cage or platform become jammed between the guides, or should its downward movement be otherwise arrested, the continued paying out or unwinding of the hoisting-cable 17 from the drum will result in a slack, which is taken up by the movement of the vertically-moving pulley, so that the cable will not slip from the guide-pulleys 18 or 19 or from the drum, as is apt to result in the constructions heretofore in use. The vertical movement of the pulley operates through the cord 8 to vibrate the lever 12 and close the clutch, and the shaft 22 is then rotated and the rack 42 is moved longitudinally to swing the arm 21 and close the valve, thereby arresting the movement of the engine.

The cord 4 may constitute the only connection between the rope 5 and the cage or cable. I prefer, however, to make use of an arm 7, extending from the cage and bearing upon a spring 31, arranged between stops 32 32 on the traveling rope, which arm forms part of an ordinary well-known Otis safety apparatus, in which the revolution of the upper pulley 24 drives a governor 33, that operates clamps 34 34, arranged to receive between them one of the pendent portions of the traveling rope and to bite thereon and arrest the movement of the same when the speed of the cage becomes excessive, as set forth in the Letters Patent granted to C. R. Otis, No. 228,107, dated May 25, 1880.

The vertically-moving pulley may be connected to work directly the stopping or shifting device. Thus the arm 35 of the stopping and starting device may be connected directly to the stirrup 26, as shown in dotted lines, or the end of the connecting-rod 8 might be attached directly to an arm 36 upon the lever 21, as also shown in dotted lines.

Without limiting myself to the precise construction and arrangement of parts shown, I claim—

1. The combination, with the cage-suspension cable, actuating-engine, and stopping and starting device of an elevator, of pulleys above and below the cage, one being vertically movable and connected with a stopping and starting device, and a traveling rope passing round said pulleys and connected with the cable at a point above its connection with the cage, substantially as set forth.

2. The combination, with an elevator-cage and with its actuating-engine and stopping and starting device and suspensory cable, of a link in the line of said cable, a traveling rope, upper and lower pulleys supporting said rope in a position adjacent to the path of the cage, a connecting-cord between the rope and said link, and a connection between the stopping and starting device and one of the pulleys which is vertically movable, substantially as set forth.

3. The combination of the elevator-cage, suspensory cable, and engine provided with a stopping and starting device, of a vertically-movable pulley connected with the stopping and starting device, a pulley supported in fixed bearings, and a traveling rope provided with a pulley 11 at one end and passing round said pulleys beneath the pulley 11 and connected with the suspensory cable, substantially as set forth.

RUDOLPH C. SMITH.

Witnesses:
  J. R. SEWINA,
  WILLIAM MOLLOY.